(12) United States Patent
Kolton

(10) Patent No.: US 10,192,223 B2
(45) Date of Patent: Jan. 29, 2019

(54) METHOD OF IDENTIFYING AUTHENTIC VERSUS COUNTERFEIT PRODUCTS USING WARRANTY TRACKING

(71) Applicant: Timothy Val Kolton, Arlington, TX (US)

(72) Inventor: Timothy Val Kolton, Arlington, TX (US)

(73) Assignee: V-Moda, LLC, Los Angeles, CA (US)

( * ) Notice: Subject to any disclaimer, the term of this patent is extended or adjusted under 35 U.S.C. 154(b) by 607 days.

(21) Appl. No.: 14/263,930

(22) Filed: Apr. 28, 2014

(65) Prior Publication Data

US 2015/0310453 A1 Oct. 29, 2015

(51) Int. Cl.
*G06Q 30/00* (2012.01)

(52) U.S. Cl.
CPC ................ *G06Q 30/0185* (2013.01)

(58) Field of Classification Search
USPC .......................................... 235/380
See application file for complete search history.

(56) References Cited

U.S. PATENT DOCUMENTS

| | | | |
|---|---|---|---|
| 2010/0191772 A1* | 7/2010 | Brown | G06Q 10/10 707/796 |
| 2012/0217304 A1* | 8/2012 | Atkinson | G06K 19/06018 235/488 |
| 2013/0073432 A1* | 3/2013 | Mulholland | G06Q 20/40 705/26.61 |

* cited by examiner

*Primary Examiner* — Rafferty Kelly

(74) *Attorney, Agent, or Firm* — Edwin Tarver

(57) ABSTRACT

A method of identifying authentic products versus counterfeit products using tow unique identifier codes is accomplished by providing a first identifier code on the exterior of a product package that identifies the product, the appropriate location for sale, the number of times the code has been scanned and whether or not the product is registered. This information alerts potential purchasers if the product is either counterfeit, or an unauthorized resale. The purchaser then opens the package and is provided a second identifier code for registering the product. The registration information includes retailer and price information, alerting the manufacturer of unauthorized retail activity, and also changes the product designation in the manufacturer database to indicate the product may not be resold. That information is then associated with the first identifier code in the event it is rescanned by another potential purchaser.

16 Claims, 1 Drawing Sheet

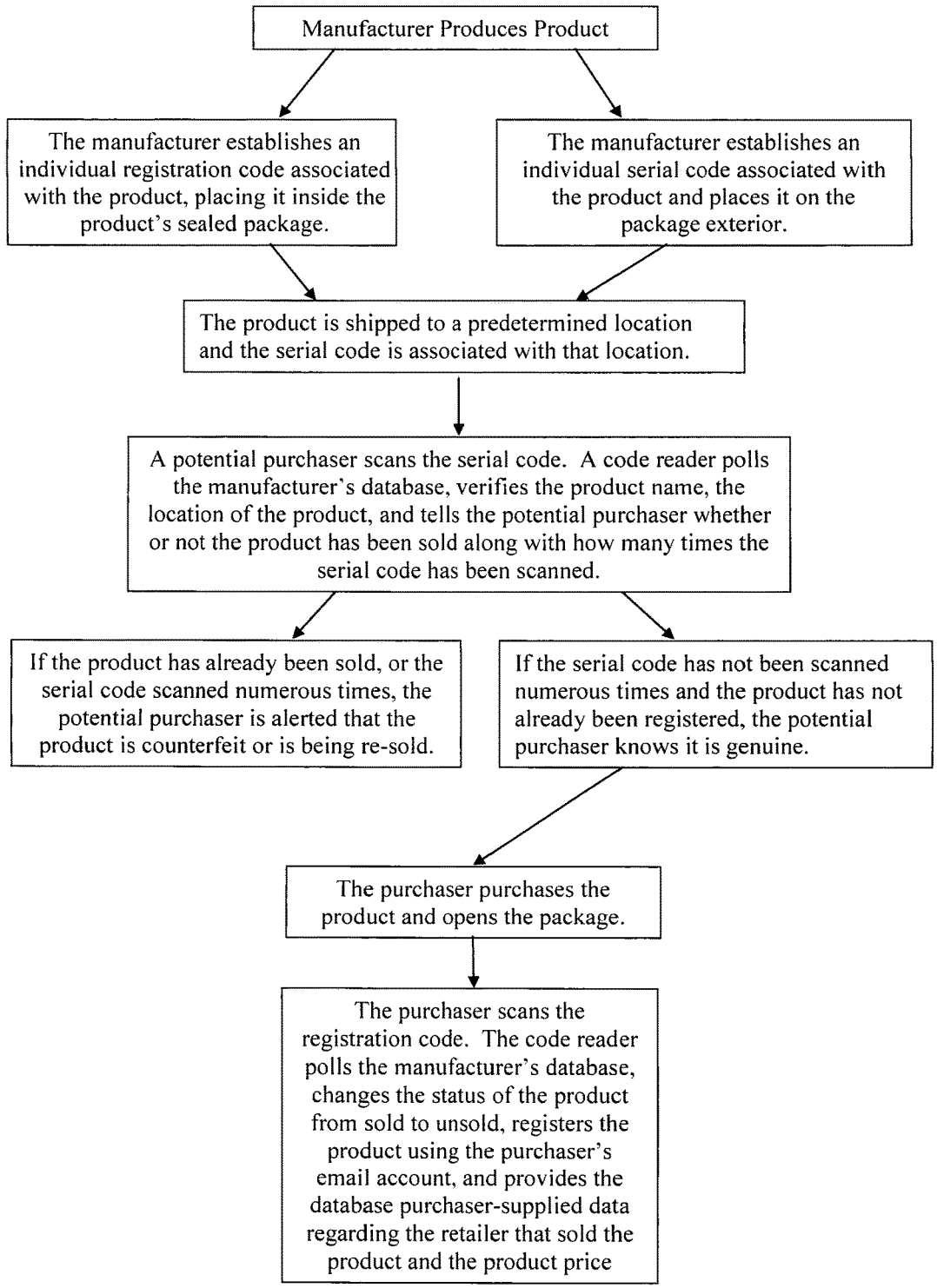

METHOD OF IDENTIFYING AUTHENTIC VERSUS COUNTERFEIT PRODUCTS USING WARRANTY TRACKING

BACKGROUND

Manufactured goods are typically warranted against defects for a predetermined period of time after purchase. In present warranty registration methods for manufactured goods, a card is included in the packaging. In order to register the product and authenticate the warranty, users must fill out the card and send it back to the manufacturer by mail. This process is inefficient and unreliable. Filling out a postcard in pen and sending it for mail delivery is time consuming, and purchasers of manufactured goods frequently either lose warranty registration cards or dispose of them due to inconvenience.

Manufacturers of expensive goods and sought-after brands also suffer from the production of counterfeits and the unauthorized resale of previously sold goods. Manufacturers may be compelled to honor warranties on these counterfeit or re-sold goods as there is no way to track whether or not retailers are selling products at the suggested price or re-selling returned goods. Furthermore, it is difficult for potential purchasers to determine before actually purchasing a product whether the product they are purchasing is counterfeit or a product being re-sold without authorization. This leads to a lack of trust between manufacturers and purchasers.

There is therefore a need for a warranty and registration system that allows potential purchasers to determine that a product is a genuine article prior to sale. There is also a need for a mechanism for reporting counterfeit products or products being re-sold without authorization based on information provided by the potential purchaser. Additionally, there is a need for a mechanism allowing purchasers to easily register a product after purchase, that also provides a manufacturer with notice that an individual product has been sold and monitoring information about retail sales of the product to ensure genuine products are sold at the appropriate price. These and other issues are addressed in the accompanying summary, description and claims.

SUMMARY

A method of identifying authentic products from counterfeit products and registering authentic products includes the steps of prompting a user to scan a first identifier code on the exterior of a package containing a product, then transmitting the first identifier code to a supplier server having a database. Using the database the first identifier code is correlated to corresponding product information in the database including the product name, the product's location data, the number of times the package has been scanned, and whether or not the product is sellable.

The product information is then transmitted to the user, including displaying the information on the user's mobile device as a web-based response to scanning a QR code. Once the product has been verified by the user as authentic, the user may opt to purchase the product and open the package. Once the package is opened, the user is prompted to scan a second identifier code, which is internal to the package, and may be stored along with the user guide and warranty information. The second identifier code may also be a QR code, and when scanned, the second identifier code information is transmitted to the supplier server.

The second identifier code is also correlated to information regarding the specific product in the database and information is sent to the user's mobile device reflecting the registration number and prompting the user to register the product. When registering the product, the user indicates the country of residence, the retailer where the product is purchased, and the purchase price. In this manner, the manufacturer can monitor the activities of retailers of the product. Additionally, once the user registers the product, information related to the number of times the product has been scanned and whether or not the product is sellable is modified so that any future scanning of the serial number reflects to any future potential purchaser that scan the package that the product has already been scanned and purchased.

Additionally, a separate, third serial number may be assigned with location data to a group of identical products, the serial number location data matching the first identifier code of each individual product thereby allowing larger quantities of products to be monitored. Preferably the product information and user registration are accessed through separate URLs. In some instances a user may not have a web-enabled QR reader. Therefore the first identifier code may appear alongside a corresponding serial number bar code and URL link to a product information feature of the database, and the second identifier code appears alongside a registration number and serial number corresponding to the first identifier code, and a URL link to registration feature of the database.

BRIEF DESCRIPTION OF THE FIGURES

FIG. 1 is a flow chart diagram of the double authentication process.

DESCRIPTION

A method of identifying authentic products from counterfeit products includes a double authentication process involving the use of two separate QR codes. Initially, a first QR code is assigned to a product. Although a QR code is exemplary, it may be desirable to use any other type of coding, such as a serial code, or any newly developed codes having the ability to represent data. The first QR code is affixed to the exterior of a package bearing the product. The first QR code may be featured prominently on the product, or may be adjacent other serial code indicia, including testing and disposal indicia, typically located on the bottom or back of product packaging. As discussed other types of codes may be used, including a bar code and bar code reader, or other information-containing indicia and related reading technology may be used.

When a potential purchaser of a product approaches the product package and locates the first QR code, the potential purchaser can scan the first QR code using a QR reader on a mobile device. Typically, the QR reader on a web-enabled phone or mobile device will open a browser on the mobile device and poll a database with the first QR code data. The database is typically located on a server of the supplier of the product, although a third party database host is contemplated.

The database responds by providing the user with information related to the individual QR code, and consequently, the individual product. Various types of information contemplated include the product name, the product's location data, the number of times the product has been scanned, and whether or not the product is sellable.

The product name information is provided to ensure that the serial number associated with the product corresponds to the product itself. If the product identified by the first QR code and the product identified by the package do not match, the user will know that the product may be counterfeit and alert the seller of the product. The product location data is intended to be the general area in which the product is sold. This may be the central warehouse from which the product is delivered to individual sellers, or, in the case of large volume sellers, the seller's location itself. In a similar manner, if the product location data identified by the first QR code and the location of the product do not match, the user will be aware that the product is potentially a counterfeit or unauthorized resale product.

The other information provided by the first QR code includes the number of times the product has been scanned, and whether or not the product is sellable. Although any potential purchasers may scan the first QR code, since it is external to the box. The database will provide any subsequent potential purchaser with the number of times a product has been scanned.

If the number is excessive, there is a likelihood that the first QR code has been copied across multiple individual products, and is therefore likely a counterfeit. If a corresponding second QR code inside the box has not been scanned, the product is designated 'sellable' (i.e., the product remains unopened from the time of manufacture and packaging). Once the user scans the corresponding second QR code, the database changes the designation of the product to 'not sellable,' that is, the package has been opened and the product may be an unauthorized resale.

By providing information regarding the product's identity (model number, trade name, etc.), intended location of sale, number of times scanned, and whether or not the product is sellable (i.e., previously registered), trust is built up between the product manufacturer and purchaser, who can be assured of the authenticity of the product, thereby encouraging sales of the product over other, similar, competing products lacking such information. Once purchased, a user may open the package, thereby gaining access to the second QR code.

Inside the sealed package, a second QR code is included with the product. The second QR code may preferably be located on a user guide, warranty information card, or other easily accessible location. The second QR code is designated a registration code and also corresponds to the individual product in the package.

After purchasing and opening the package bearing the product, in the process breaking any seal holding the package closed, the user locates the second identifier code, also preferably a QR code (designated a "registration QR code") and scans it using a mobile device. The registration QR code will open a browser on the mobile device and poll a database bearing registration data. Although the database is typically located on a server of the supplier of the product, a third party database host is also contemplated. When polled the database transmits a registration web page to the user. The registration web page includes an auto-populated registration number field, and includes other fields for the user to enter information.

The information requested by the registration page in the user-entered fields includes the user's country of residence, the retailer from which the product was purchased, the purchase price, and the user's email address. By including the user's email address, the warranty for a particular product can be easily associated with the user's email, for honoring the warranty and providing replacement headphones and repairs to the proper individual. By entering the retailer and purchase price information, the user provides the manufacturer of the product information confirming that the product is genuine, not counterfeit, and is being sold without raising the price.

In addition to verifying the seller and price point at which the product is sold, registering the product in this manner is made easy, allowing the purchaser to register the warranty by simply providing an email address. Making warranty registration easy also helps the product manufacturer police the activities of retailers, ensuring that the retailer is authorized to sell the product and that the retailer is selling the product at the proper price. Once the registration data has been communicated to the database, the product is designated as sold and registered and the unique registration QR code cannot be used to re-register the product. Additionally, the first QR code is associated with a registered product after registration, and the product information related to the first QR code is designated "not sellable," thereby alerting potential purchasers that an already registered product is either counterfeit or being resold without authorization.

Referring to FIG. 1, a flow chart diagram of the process is shown. Once a manufacturer produces a product, the product is assigned a serial number and a registration number. Those numbers are embodied in two QR codes. The first, a serial number QR code is placed on the package exterior. The second, a registration QR code is placed inside the sealed package. The product is then shipped to a predetermined location and the serial number QR code is associated with that location. Once at the location of sale, for instance a retailer of the product, a potential purchaser scans the serial number QR code. The QR code reader polls the manufacturer's database, verifies the product name, the location of the product, and tells the potential purchaser whether or not the product has been sold along with how many times the serial number has been scanned.

If the product has already been sold, or the serial number scanned numerous times, the potential purchaser is alerted that the product is counterfeit or is being re-sold and the purchaser can avoid purchasing the product. If the serial number has not been scanned numerous times and the product has not already been registered, the potential purchaser knows it is genuine. The purchaser purchases the product and opens the package and scans the registration QR code. The QR code reader polls the manufacturer's database, changes the status of the product from sold to unsold, registers the product using the purchaser's email account, and provides the database purchaser-supplied data regarding the retailer that sold the product and the product price. In this manner, trust is built up between the purchaser and the manufacturer.

The foregoing description of the preferred embodiment of the Invention is sufficient in detail to enable one skilled in the art to make and use the invention. It is understood, however, that the detail of the preferred embodiment presented is not intended to limit the scope of the invention, in as much as equivalents thereof and other modifications which come within the scope of the invention as defined by the claims will become apparent to those skilled in the art upon reading this specification.

What is claimed is:

1. A method of identifying authentic products from counterfeit products comprising the steps of:
 a purchaser scanning an identifier code on an exterior of a package containing a product;
 transmitting the identifier code to a supplier server having a database;

the supplier server matching the identifier code to corresponding stored product information in the database including a product name, a product location data, and a number of times the identifier code matching the stored product information has been scanned;

transmitting the stored product information to the purchaser;

the purchaser opening the package;

the purchaser scanning a second identifier code on an interior of the package;

transmitting the second identifier code to the supplier server; and prompting the purchaser to register the product, wherein upon registration the supplier server updates the database with purchaser identifying information, the number of times the product has been scanned, and an indication that the product has been sold.

2. The method of claim 1, further comprising the step of updating information in the database with user registration information.

3. The method of claim 2, wherein the user registration information includes a user's name, email, the name of a vendor that sold the product and a purchase price.

4. The method of claim 1 wherein the code is a QR code.

5. The method of claim 1 further comprising the step of scanning the first identifier code and second identifier code with a scanning program on a mobile device.

6. The method of claim 1 wherein the first identifier code and the second identifier code comprise quick response codes.

7. The method of claim 1 including, the step of changing a product designation from a sellable product to a non-sellable product upon transmission of the second identifier code.

8. The method of claim 1 including the step of granting a user access to a second database having music content upon scanning of the second identifier code.

9. The method of claim 1 wherein the location data includes identifying the manufacturing location of the product.

10. The method of claim 1 wherein the location data includes identifying the warehousing location of the product.

11. The method of claim 10, wherein the warehousing location of the product is proximal to the point of sale of the product.

12. The method of claim 1 further comprising the step of assigning a serial number with location data to a single group of identical products, the serial number location data matching the first identifier code of each individual product.

13. The method of claim 1 wherein the product information and user registration are accessed through separate URLs.

14. The method of claim 1 wherein the first identifier code appears alongside a corresponding serial number bar code and URL link to a product information feature of the database.

15. The method of claim 2 wherein the second identifier code appears alongside a registration number and serial number corresponding to the first identifier code, and a URL link to registration feature of the database.

16. A method of identifying distinguishing authentic products from counterfeit, products comprising the steps of:

prompting a user to scan a first QR code on the exterior of a package containing a product, the user scanning the QR code with a QR reader on a mobile device;

transmitting the QR code to a supplier server having a database;

correlating the QR code to corresponding product information in the database including the product's name, the product's location data, the number of times the product has been scanned, and whether or not the product has been registered;

transmitting the product information to the user;

the user breaking a seal, thereby allowing the user to open the package;

prompting the user to scan a second QR code internal to the package;

transmitting the second identifier code to the supplier server; and prompting the user to register the product, wherein the database is updated with the number of times the product has been scanned, product registration information and an indication that the product is not sellable.

* * * * *